United States Patent
Deng et al.

(10) Patent No.: US 12,262,851 B2
(45) Date of Patent: Apr. 1, 2025

(54) BLENDER SYSTEM WITH VIBRATION PROOF SEAL

(71) Applicant: SHARKNINJA OPERATING LLC, Needham, MA (US)

(72) Inventors: Yaoming Deng, Guangdong (CN); Smith Shi, Guangdong (CN); Kevin Pei, Guangdong (CN); Kai Zhou, Guangdong (CN); Gang Chen, Guangdong (CN); Edward Lockyer, Pimlico (GB); Sam Bannister, Kent (GB); Matt Roberts, Needham, MA (US); Nicholas Michael O'Loughlin, Hong Kong (CN); Joshua D. Anthony, Billerica, MA (US)

(73) Assignee: SharkNinja Operating LLC, Needham, MA (US)

( * ) Notice: Subject to any disclaimer, the term of this patent is extended or adjusted under 35 U.S.C. 154(b) by 1058 days.

(21) Appl. No.: 17/267,272

(22) PCT Filed: Aug. 10, 2018

(86) PCT No.: PCT/CN2018/099928
§ 371 (c)(1),
(2) Date: Feb. 9, 2021

(87) PCT Pub. No.: WO2020/029239
PCT Pub. Date: Feb. 13, 2020

(65) Prior Publication Data
US 2021/0338012 A1 Nov. 4, 2021

(51) Int. Cl.
A47J 43/07 (2006.01)
A47J 43/046 (2006.01)
A47J 43/08 (2006.01)

(52) U.S. Cl.
CPC ......... *A47J 43/0727* (2013.01); *A47J 43/046* (2013.01); *A47J 43/085* (2013.01)

(58) Field of Classification Search
CPC ....... A47J 43/046; A47J 43/085; B01F 33/70; B01F 35/2213; B01F 2035/351
See application file for complete search history.

(56) References Cited

U.S. PATENT DOCUMENTS

| 5,810,472 A | 9/1998 | Penaranda et al. |
| 6,554,023 B2 | 4/2003 | Danby et al. |
| (Continued) | | |

FOREIGN PATENT DOCUMENTS

| CN | 1551755 A | 12/2004 |
| CN | 105682517 A | 6/2016 |
| (Continued) | | |

OTHER PUBLICATIONS

International Search Report and Written Opinion of the International Searching Authority; International Application No. PCT/CN2018/099928; International Filing Date: Aug. 10, 2018; Date of Mailing: May 9, 2019; 10 pages.

(Continued)

*Primary Examiner* — Marc C Howell
(74) *Attorney, Agent, or Firm* — The Webb Law Firm (57) ABSTRACT

Disclosed are a container assembly and a food processing system (20) comprising thereof. The container assembly includes a sealable body including a chamber (32), a chamber opening (56) formed in the sealable body, and a vacuum sealing assembly (52) mounted to the sealable body adjacent the chamber opening (56). The vacuum sealing assembly (52) includes a needle valve (60) having a needle valve opening formed therein. The needle valve (60) is movable relative to the chamber opening (56) such that the needle valve opening is movable into and out of the chamber (32).

(Continued)

A biasing mechanism (74) is operably coupled to the needle valve (60) to move the needle valve opening out of the chamber (32).

19 Claims, 9 Drawing Sheets

(56) References Cited

U.S. PATENT DOCUMENTS

| | | | | |
|---|---|---|---|---|
| 7,670,042 | B2* | 3/2010 | Cheung | B01F 29/63 |
| | | | | 366/208 |
| 9,650,183 | B2 | 5/2017 | Chen et al. | |
| 9,930,986 | B2* | 4/2018 | Arai | A47J 27/04 |
| 10,299,630 | B2 | 5/2019 | Chung | |
| 2009/0026231 | A1* | 1/2009 | Goodwin | B65D 47/283 |
| | | | | 222/514 |
| 2009/0207688 | A1* | 8/2009 | Flackett | B01F 33/70 |
| | | | | 366/139 |
| 2015/0201808 | A1* | 7/2015 | Katsuki | A23N 1/02 |
| | | | | 241/199.12 |
| 2016/0345779 | A1 | 12/2016 | Tu | |
| 2017/0231431 | A1* | 8/2017 | Maeng | A47J 43/0716 |
| | | | | 99/485 |
| 2018/0220829 | A1* | 8/2018 | Zhang | A47J 43/0716 |
| 2020/0205614 | A1* | 7/2020 | Ahn | B02C 18/16 |
| 2020/0282372 | A1* | 9/2020 | Liu | A47J 19/00 |

FOREIGN PATENT DOCUMENTS

| | | |
|---|---|---|
| CN | 105919396 A | 9/2016 |
| CN | 107049071 A | 8/2017 |
| CN | 107088005 A | 8/2017 |
| CN | 107212770 A | 9/2017 |
| CN | 107847059 A | 3/2018 |
| CN | 207084722 U | 3/2018 |
| DE | 7607714 U1 | 8/1976 |
| DE | 19504638 A1 | 8/1996 |
| EP | 2005867 A1 | 12/2008 |
| EP | 3315057 A2 | 5/2018 |
| EP | 3323329 A1 | 5/2018 |
| WO | 2017205471 A1 | 11/2017 |

OTHER PUBLICATIONS

Notification of the First Office Action in Chinese Application No. 201880096810.8 dated Feb. 29, 2024 [with English translation], 10 pages.

* cited by examiner

BLENDER SYSTEM WITH VIBRATION PROOF SEAL

CROSS REFERENCE TO RELATED APPLICATIONS

This application is a National Stage Application of PCT/CN2018/099928 filed Aug. 10, 2018, which is incorporated by reference in its entirety herein.

BACKGROUND

Exemplary embodiments of the present invention relate to a blender, and more particularly to a container of a blender configured to receive one or more food items therein.

Blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Several benefits can be achieved by forming a vacuum within a blender container or attachment either prior to or after a blending operation. For example, by forming a vacuum prior to a blending operation, the overall degradation of the nutritional properties of the ingredients being processes may be reduced. Accordingly, a blender container or attachment may include a seal that is movable to selectively form a vacuum within the blender container. However, when the blender container is used in high vibration environments, such as in a vehicle or when the container is being carried in a bag for example, it is possible that liquid or other ingredients from the interior of the blender container may leak through the seal.

SUMMARY

According to an embodiment of the invention, a container assembly includes a sealable body including a chamber, a chamber opening formed in said sealable body, and a vacuum sealing assembly mounted to said sealable body adjacent said chamber opening. The vacuum sealing assembly includes a needle valve having a needle valve opening formed therein. The needle valve is movable relative to said chamber opening such that the needle valve opening is movable into and out of said chamber. A biasing mechanism is operably coupled to said needle valve to move said needle valve opening out of said chamber.

In addition to one or more of the features described above, or as an alternative, in further embodiments said needle valve is arranged in sealing engagement with said chamber opening when said needle valve opening is out of said chamber and said sealing engagement between said needle valve and said chamber opening is broken when said needle valve opening is in said chamber.

In addition to one or more of the features described above, or as an alternative, in further embodiments said needle valve further comprises a generally hollow valve stem arranged in fluid communication with said needle valve opening.

In addition to one or more of the features described above, or as an alternative, in further embodiments said vacuum sealing assembly further comprises an umbrella valve coupled to said needle valve to selectively seal said generally hollow valve stem.

In addition to one or more of the features described above, or as an alternative, in further embodiments comprising a base support mounted in overlapping arrangement with a portion of said sealable body, said needle valve being receivable within said base support.

In addition to one or more of the features described above, or as an alternative, in further embodiments said base support further comprises a protrusion operable to break a sealing engagement between said umbrella valve and said needle valve when said needle valve opening is in said chamber.

In addition to one or more of the features described above, or as an alternative, in further embodiments comprising a vacuum pad coupled to said needle valve, said vacuum pad including a central opening.

In addition to one or more of the features described above, or as an alternative, in further embodiments said vacuum pad further comprises at least one channel arranged in fluid communication with said central opening.

In addition to one or more of the features described above, or as an alternative, in further embodiments comprising a cover disposed about at least a side of said vacuum sealing assembly, wherein said cover restricts movement of said needle valve via engagement with said vacuum pad.

In addition to one or more of the features described above, or as an alternative, in further embodiments said biasing mechanism is a coil spring mounted between said sealable body and said needle valve.

In addition to one or more of the features described above, or as an alternative, in further embodiments the container assembly is configured for use with a food processing system.

In addition to one or more of the features described above, or as an alternative, in further embodiments the sealable assembly further comprises: a container defining said chamber, said container having an open end and a rotatable blade assembly connected to said open end of said container.

In addition to one or more of the features described above, or as an alternative, in further embodiments said vacuum sealing assembly is formed in said container.

In addition to one or more of the features described above, or as an alternative, in further embodiments said vacuum sealing assembly is formed in said rotatable blade assembly.

In addition to one or more of the features described above, or as an alternative, in further embodiments the sealable assembly further comprises a container defining said chamber, said container having an open end, at least one rotatable blade disposed within said chamber and a lid connected to said open end of said container.

In addition to one or more of the features described above, or as an alternative, in further embodiments said vacuum sealing assembly is formed in said lid.

According to another embodiment, a food processing system includes a food processor base including a rotary component and an attachment configured for removable association with said food processor base. The attachment includes a sealable body including at least one opening and a rotary coupling connected to at least one blade positioned within said chamber of said sealable body. The rotary coupling is associable with said rotary component of said food processor base. A vacuum sealing assembly is mounted to said container adjacent said at least one chamber opening. The vacuum sealing assembly includes a needle valve having a needle valve opening formed therein. The needle valve is movable in and out of said chamber opening to fluidly couple said needle valve opening and said chamber.

In addition to one or more of the features described above, or as an alternative, in further embodiments rotation of said at least one blade is driven by said rotary component.

In addition to one or more of the features described above, or as an alternative, in further embodiments said rotary component is configured to engage and drive said rotary coupling of said rotatable blade assembly.

In addition to one or more of the features described above, or as an alternative, in further embodiments comprising a biasing mechanism operably coupled to said needle valve to move said needle valve opening out of said chamber.

In addition to one or more of the features described above, or as an alternative, in further embodiments said needle valve is arranged in sealing engagement with said chamber opening when said needle valve opening is out of said chamber and said sealing engagement between said needle valve and said chamber opening is broken when said needle valve opening is in said chamber.

In addition to one or more of the features described above, or as an alternative, in further embodiments said needle valve further comprises a generally hollow valve stem arranged in fluid communication with said needle valve opening.

In addition to one or more of the features described above, or as an alternative, in further embodiments comprising an umbrella valve coupled to said needle valve to selectively seal said generally hollow valve stem.

In addition to one or more of the features described above, or as an alternative, in further embodiments comprising a protrusion operable to break a sealing engagement between said umbrella valve and said needle valve when said needle valve opening is in said chamber.

According to another embodiment, a method of blending one or more food items includes arranging the one or more food items within a chamber of a food processing container, moving a needle valve opening formed in a needle valve into fluid communication with said chamber to form a vacuum within said chamber, and performing a food processing operation.

In addition to one or more of the features described above, or as an alternative, in further embodiments moving said needle valve into fluid communication with said chamber to form said vacuum within said chamber includes applying a vacuum device to said vacuum sealing assembly.

In addition to one or more of the features described above, or as an alternative, in further embodiments applying said vacuum device to said vacuum sealing assembly opposes a biasing force of a biasing mechanism coupled to said needle valve.

In addition to one or more of the features described above, or as an alternative, in further embodiments forming said vacuum within said chamber includes applying a negative pressure to an umbrella valve sealing a hollow valve stem of said needle valve, said hollow valve stem being fluidly coupled to said needle valve opening.

In addition to one or more of the features described above, or as an alternative, in further embodiments applying said negative pressure to an umbrella valve fluid couples said chamber with said opening to draw.

In addition to one or more of the features described above, or as an alternative, in further embodiments comprising removing said vacuum device prior to performing said food processing operation.

In addition to one or more of the features described above, or as an alternative, in further embodiments comprising moving said needle valve opening into fluid communication with said chamber to release said vacuum within said chamber.

In addition to one or more of the features described above, or as an alternative, in further embodiments moving said needle valve opening into fluid communication with said chamber to release said vacuum within said chamber further comprises manually applying a force to said needle valve.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
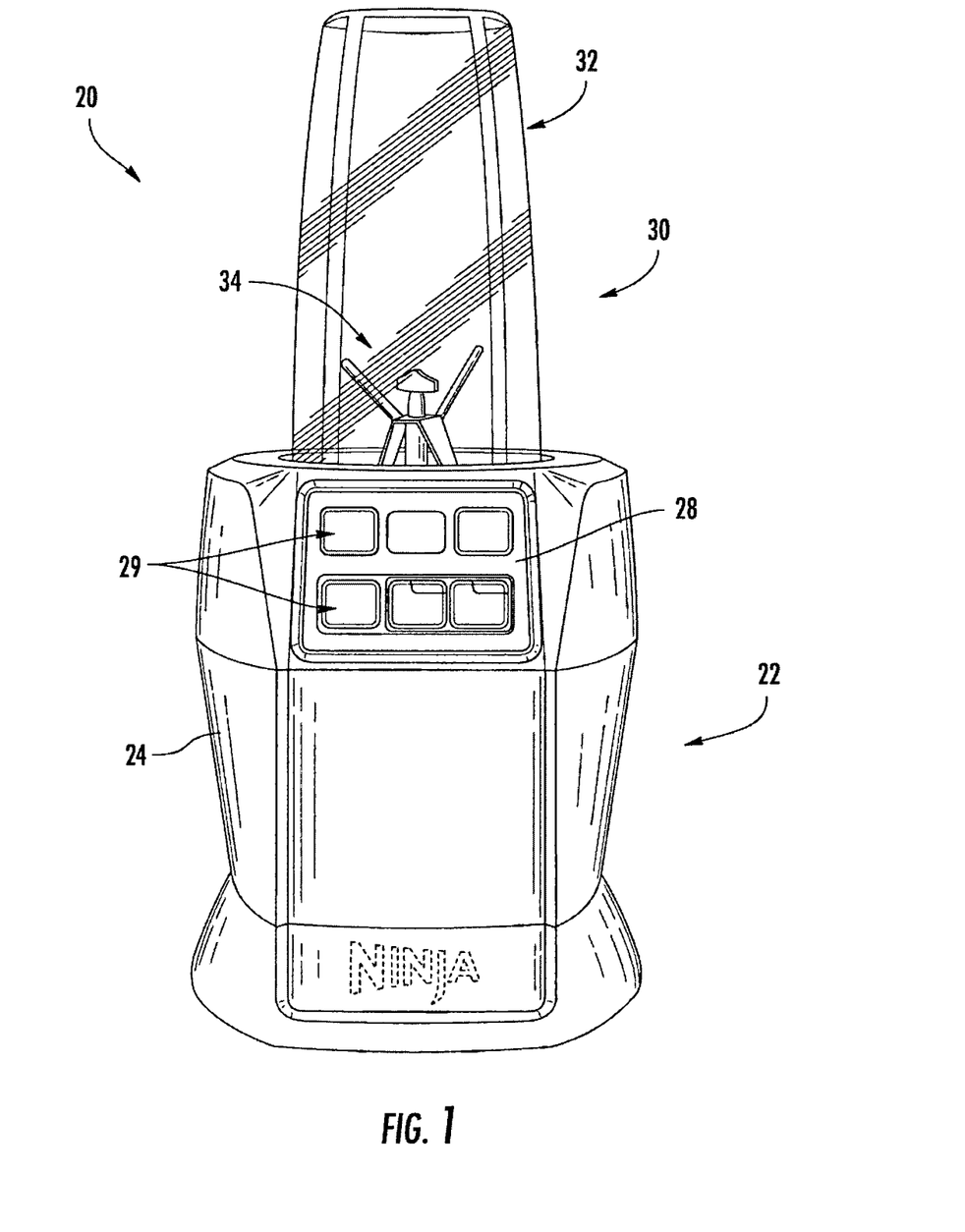
FIG. 1 is a perspective view of an example of a food processing system.
Figure 2:
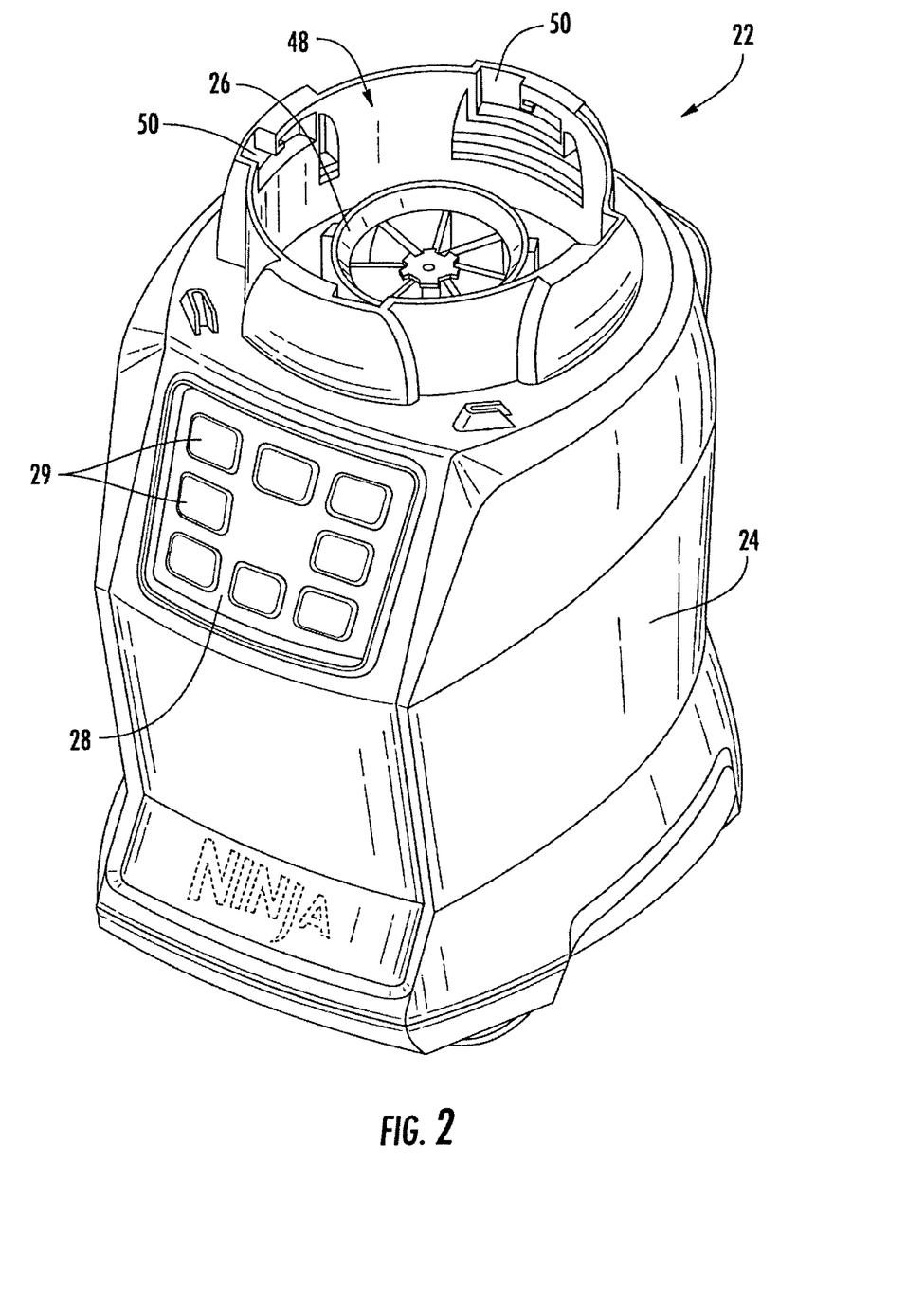
FIG. 2 is a perspective view of a base of a food processing system.

Referring now to FIGS. 1 and 2, an example of a multi-functional food processing system 20 is illustrated in more detail. In general, the food processing system 20 can be adapted to perform any food processing or blending operation including as non-limiting examples, dicing, chopping, cutting, slicing, mixing, blending, stirring, crushing, or the like. Although the food processing system illustrated and described herein is a personal blender system, other food processing systems are within the scope of the present disclosure.

The food processing 20 system includes a base 22 having a body or housing 24 within which a motorized unit (not shown) and at least one controller (not shown) are located. The base 22 includes at least one rotary component, such as a drive coupler 26 (see FIG. 2) for example, driven by the motorized unit located within the body 24. The base 22 additionally includes a control panel or user interface 28 having one or more inputs 29 for turning the motorized unit on and off and for selecting various modes of operation, such as pulsing, blending, or continuous food processing. The at least one drive coupler 26 is configured to engage a portion of an attachment 30 coupled to the base 22 for the processing of food products located within an interior of the attachment 30. This will become more apparent in subsequent FIGS. and discussion.

Figure 3:
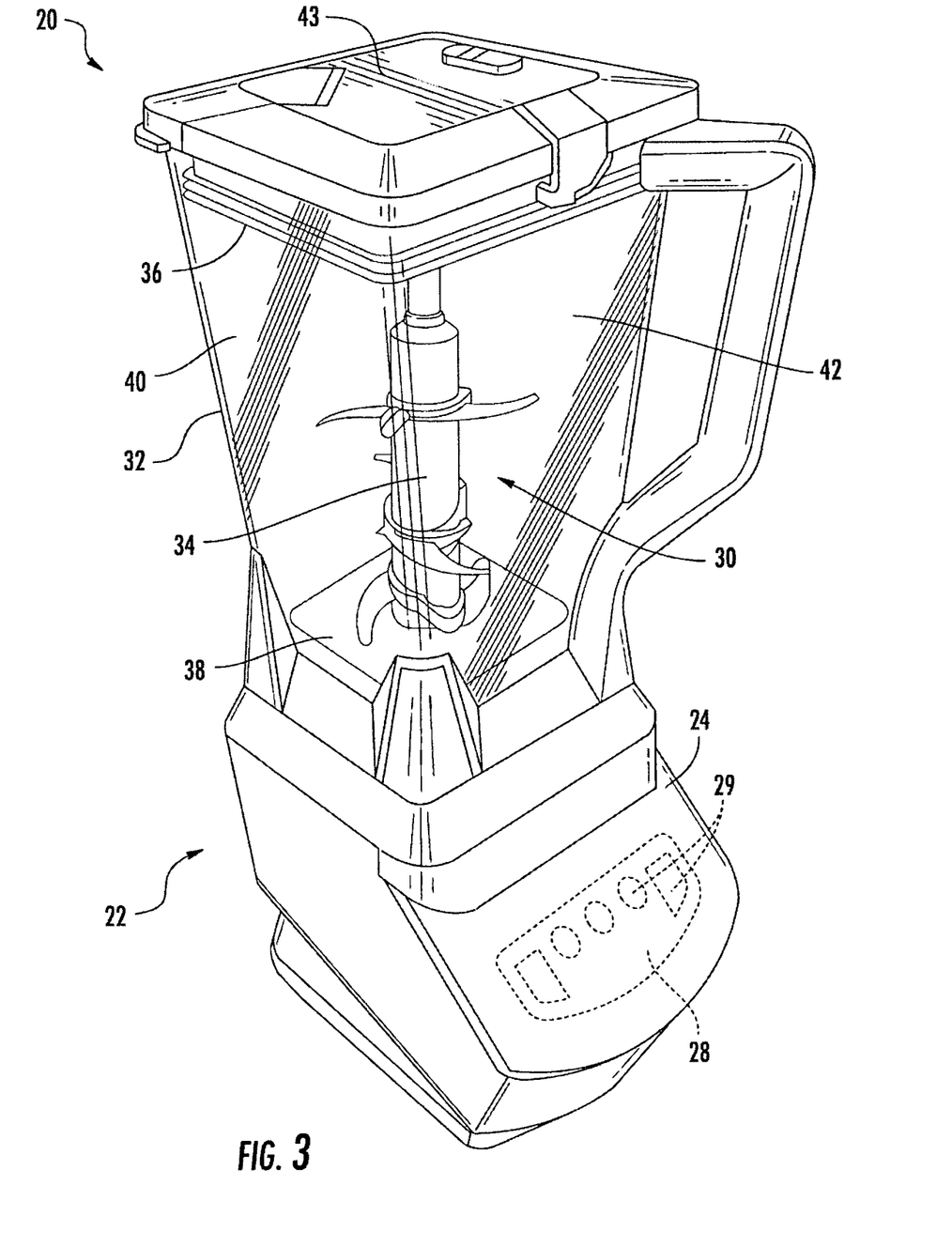
FIG. 3 is a perspective view of a food processing system having a first attachment.

One or more attachments 30 varying in size and/or functionality may be configured for use with the base 22. In an embodiment, the attachment 30 includes a jar or container 32 having a rotatable blade assembly 34. In some embodiments, the container 32 may be sized to hold approximately 72 fluid ounces. However, embodiments where the container 32 has a larger or smaller capacity are also within the scope of the disclosure. As shown, the container 32 typically includes a first open end 36, a second closed end 38, and one or more sidewalls 40 extending between the first end 36 and the second end 40 to define a hollow interior chamber 42 of the container 32. The rotatable blade assembly 34 may be integrally formed with the second end 40 of the container 32, or alternatively, may be removably coupled thereto. The attachment 30 may additionally include a lid 43 configured to couple to the first open end 36 of the container 32 to seal the container. The second sealed end 40 of the attachment of FIG. 3 is configured to mount to the base 22 to perform a food processing operation. Accordingly, the orientation of the container when the attachment is connected to the base 22 and separated from the base 22 remains generally constant.

Figure 4:
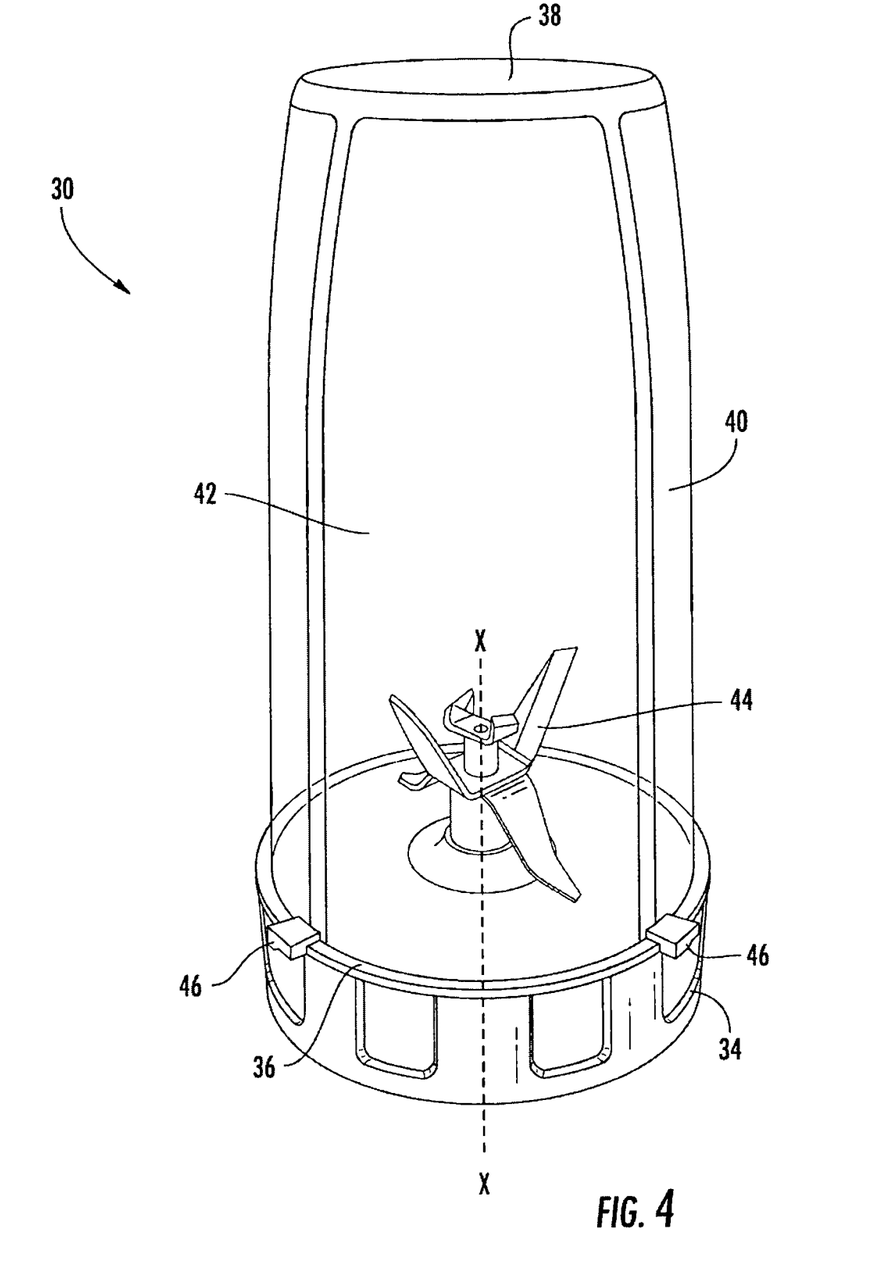
FIG. 4 is a perspective view of an attachment suitable for use with a food processing system.

Another example of an attachment suitable for use with the food processing system is shown in FIG. 4. In the illustrated, non-limiting embodiment, the attachment 30 is an inverted jar or container 32 having a rotatable blade assembly 34 coupled thereto. Similar to the attachment of FIG. 3, the container 32 typically includes a first open end 36, a second closed end 38, and one or more sidewalls 40 extending between the first end 36 and the second end 40 to define a hollow interior chamber 42 of the container 32. However, when the attachment 30 is a personal blending container that has a first configuration when separated from the base 22 and a second inverted configuration when coupled to the base 22, the rotatable blade assembly 34 is configured to couple to the first open end 36 of the container 32 to seal the chamber 42. The container 32 and blade assembly 34 may be threadably coupled together; however, it should be understood that other mechanisms for removably connecting the container 32 and the blade assembly 34 are also contemplated herein.

In each of the various attachment configurations, the rotatable blade assembly 34 is configured to couple to the base 22 of the food processing system 20. A driven coupler (not shown) associated with the at least one blade 36 is positioned outside the rotatable drive assembly 34. The at least one drive coupler 26 is configured to engage the driven coupler to rotate the at least one blade 36 about an axis X to process the food products located within the chamber 42 of the attachment 30. It should be understood that the attachment 30 including an inverted container 32 and a rotatable blade assembly 34 is intended as an example only, and that other attachments, are also contemplated herein.

In embodiments where the attachment 30 includes an inverted container 32, the attachment 30 may include one or more contact members 46, such as tabs for example, positioned about the periphery of the attachment 30. Although four contact members 46 are generally illustrated in the FIGS., any number of contact members 46 is within the scope of the disclosure. In embodiments where the attachment 30 includes an inverted container 32 and a blade assembly 34, the contact members 46 may extend outwardly from the container 32, the blade assembly 34, or both.

The contact members 46 of the attachment 30 are configured to cooperate with a mounting area 48 of the base 22 to couple the attachment 30 to the base 22. As shown, the mounting area 48 includes one or more receiving slots 50 within which each of the plurality of contact members 46 of the attachment 30 is receivable. The attachment 30 may be configured to slidably connect to the base 22 of the food processing system 20. Alternatively or in addition, the attachment 30 may be configured to rotatably connect to the base 22 such that the attachment 30 is locked relative to the base 22. However, it should be understood that any suitable mechanism for coupling the attachment to the base 22 is within the scope of the disclosure.

Figure 9:
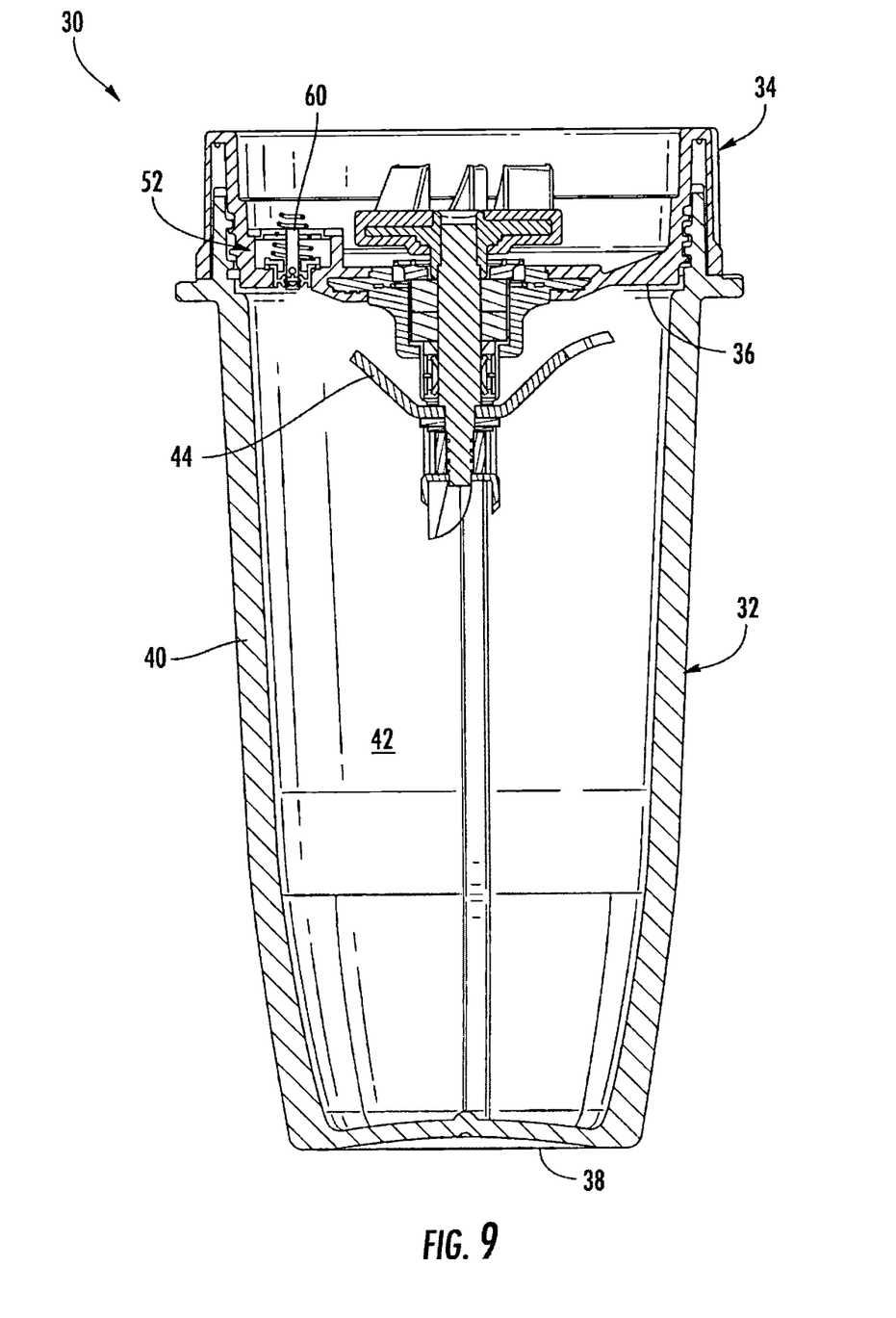
FIG. 9 is a cross-sectional view of an attachment including a vacuum sealing assembly located within the rotatable blade assembly according to an embodiment.

With reference now to FIGS. 5-8, an attachment 30 of the food processing system 20 includes a vacuum sealing assembly 52. In the illustrated, non-limiting embodiment, the vacuum sealing assembly 52 is positioned at or adjacent the closed second end 38 of the container 32. More specifically, the vacuum sealing assembly 52 may be formed in an interior wall 54 of the container 32 that seals the chamber 42 but is offset from the second end 38 of the container 32. By arranging the vacuum sealing assembly 52 at this position, the vacuum sealing assembly 52 is easily accessible by a user when an attachment 30, and in particular an attachment 30 including an inverted container 32, is coupled to the base 22 of the food processing system 20. However, in other embodiments, the vacuum sealing assembly 52 may be located at another location about the attachment 30. For example, depending on the configuration of the attachment 30, the vacuum sealing assembly 52 may be formed in a rotatable blade assembly 34, as shown in FIG. 9, or in a lid 43.

Although the vacuum sealing assembly 52 is generally illustrated as being positioned along a central axis defined by the attachment 30, it should be understood that embodiments where the vacuum sealing assembly 52 is offset from the central axis, such as adjacent an outer periphery of the attachment 30 for example, are also within the scope of the disclosure.

As shown, an opening 56 is formed in the wall 54 of the container 32. The vacuum sealing assembly 52 includes a base support 58 having a contour generally complementary to an adjacent portion of the wall 54 and a generally hollow interior. The base support 58 is positioned in overlapping arrangement with the wall 54 and a needle valve 60 is mounted relative to the base support 58. A seal 62 may be, but need not be, positioned between the wall 54 and the base support 58 adjacent the opening 56. The needle valve 60 includes a flange 64 having an outer diameter corresponding to an inner diameter of the base support 58 and a generally hollow valve stem 66 extending perpendicularly from the flange 64 towards the opening 58. In an embodiment, a hole 68 is formed near the distal end 70 of the valve stem 66, such as in a side surface thereof for example. In addition, at least one opening 72 is formed in the flange 64 adjacent one or more sides of the hollow valve stem 66.

Figure 7:
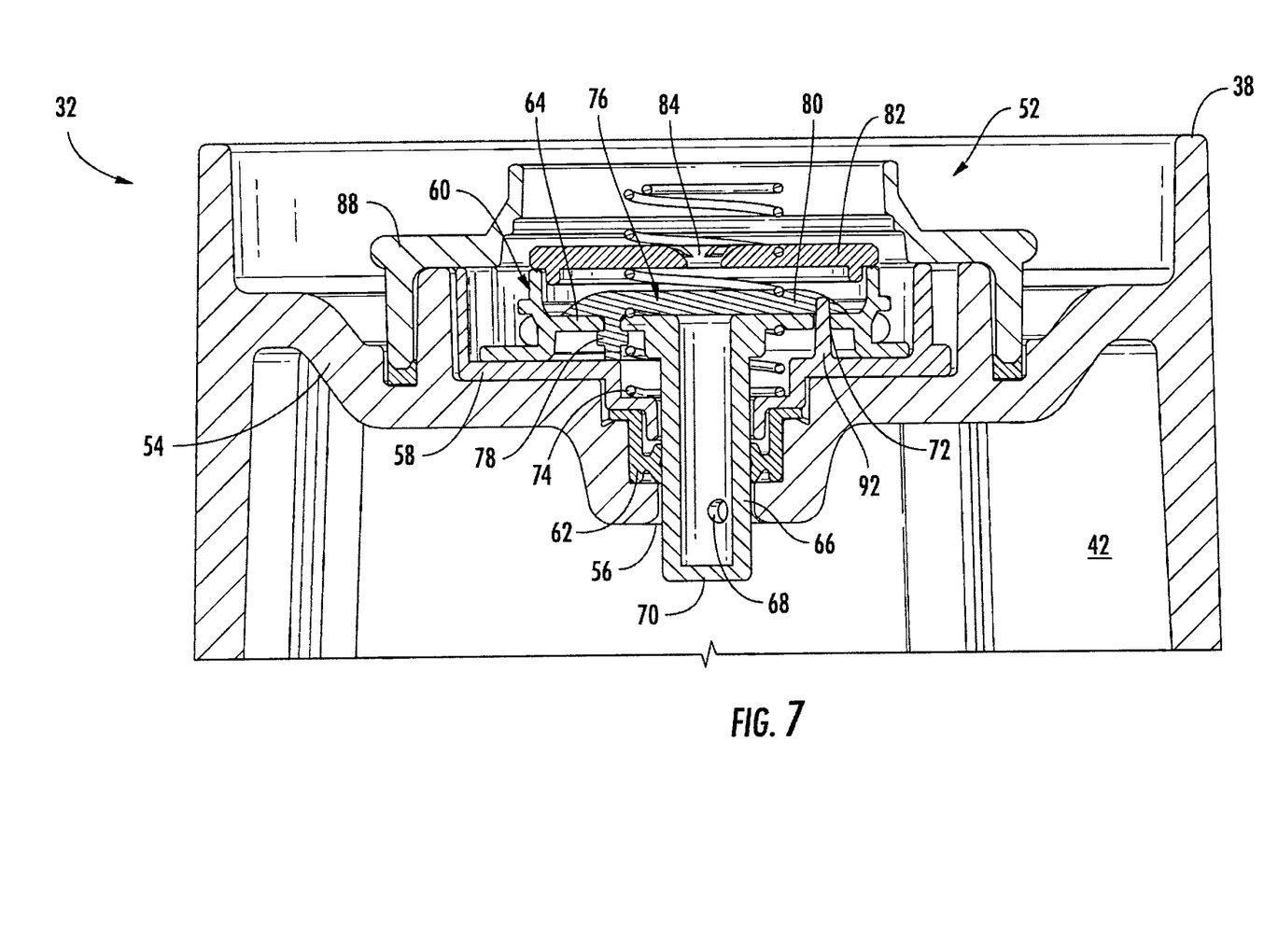
FIG. 7 is a cross-sectional view of another vacuum sealing assembly in a first configuration according to an embodiment.
Figure 8:
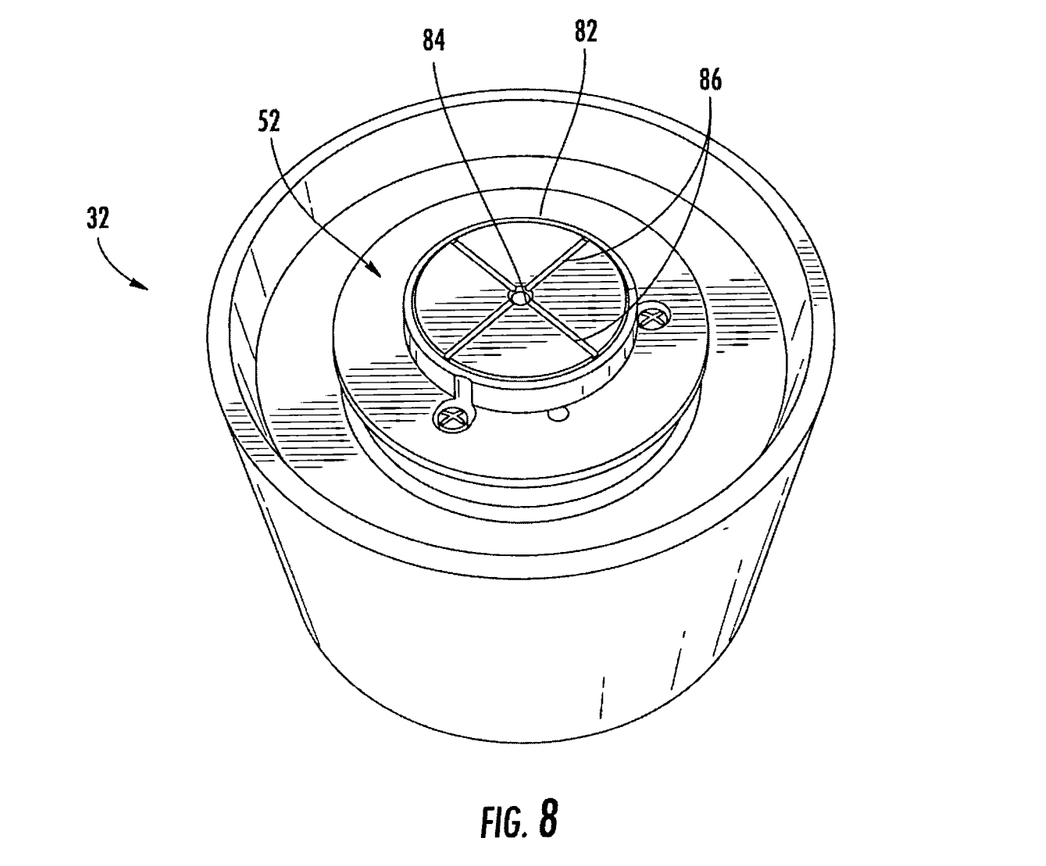
FIG. 8 is a perspective view of an upper surface of the vacuum sealing assembly according to an embodiment.

The needle valve 60 is movable relative to the base support 58 and wall 54 between a first position (FIG. 5) and a second position (FIG. 7). The vacuum assembly 52 may include a biasing member 74 configured to bias the needle valve 60 into the first position. In the illustrated, non-limiting embodiment, the biasing member 74 is a coil spring, arranged concentrically with the valve stem 66 and extending between the base support 58 and the flange 64 of the needle valve 60. However, other suitable biasing members 74 are also within the scope of the disclosure.

The vacuum sealing assembly 52 additionally includes an umbrella valve 76 operable to selectively seal the at least one opening 72 formed in the flange 64 of the needle valve 60. In an embodiment, the umbrella valve includes a plug 78 that extends through a corresponding opening formed in the flange 64. As shown, a diameter at the distal end of the plug 78 is greater than the diameter of the opening through which the plug 78 extends to restrict movement of the umbrella valve 76 relative to the needle valve 60. The umbrella valve 76 includes a flange 80 oriented substantially parallel to the flange 64 and sized such that a portion of the flange 80, such as near a periphery thereof for example, is in overlapping arrangement with the at least one opening 72 formed in the flange 64 of the needle valve 60. Accordingly, under normal operating conditions, the flange 80 of the umbrella valve 76 not only seals the hollow valve stem 66, but also seals the at least one opening 72 to prevent a flow of fluid and/or food particles there through.

A vacuum pad 82 is mounted to the distal end of the flange 64 of the needle valve 60. The vacuum pad 82 is vertically offset from the umbrella valve 76 such that a cavity is formed between the umbrella valve 76 and the vacuum pad 82. As shown, the vacuum pad 82 has a centrally located opening 84 formed therein arranged in fluid communication with an upper surface of the umbrella valve 76. In an embodiment, one or more channels 86 (see FIG. 8) are formed in an upper surface of the vacuum pad 82. The one or more channels 86 are connected to the opening 84 such that even if the opening 84 is blocked, such as by a user's finger for example, fluid is still able to flow through the vacuum pad 82 via the plurality of channels 86 fluidly coupled to the opening 84. The vacuum sealing assembly 52 may additionally include a cover 88 configured to seal the sides of the vacuum pad 82, needle valve 60, and base support 58 from exposure to contaminants, such as dust for example. In addition, a geometry of the cover 88 may be configured to define the first position of the needle valve 60 by restricting movement of the needle valve 60.

Figure 5:
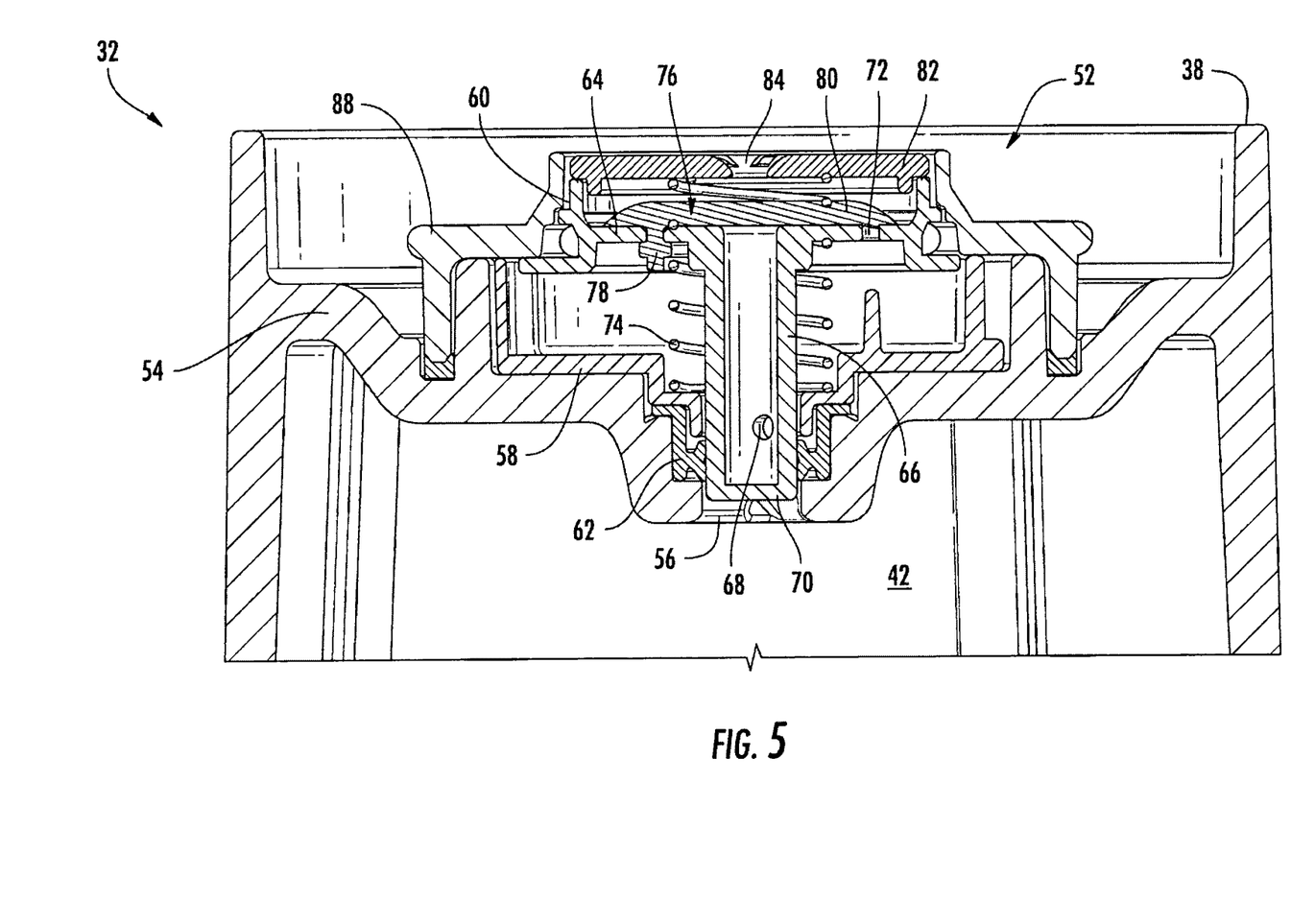
FIG. 5 is a cross-sectional view of a vacuum sealing assembly in a first configuration according to an embodiment.
Figure 6:
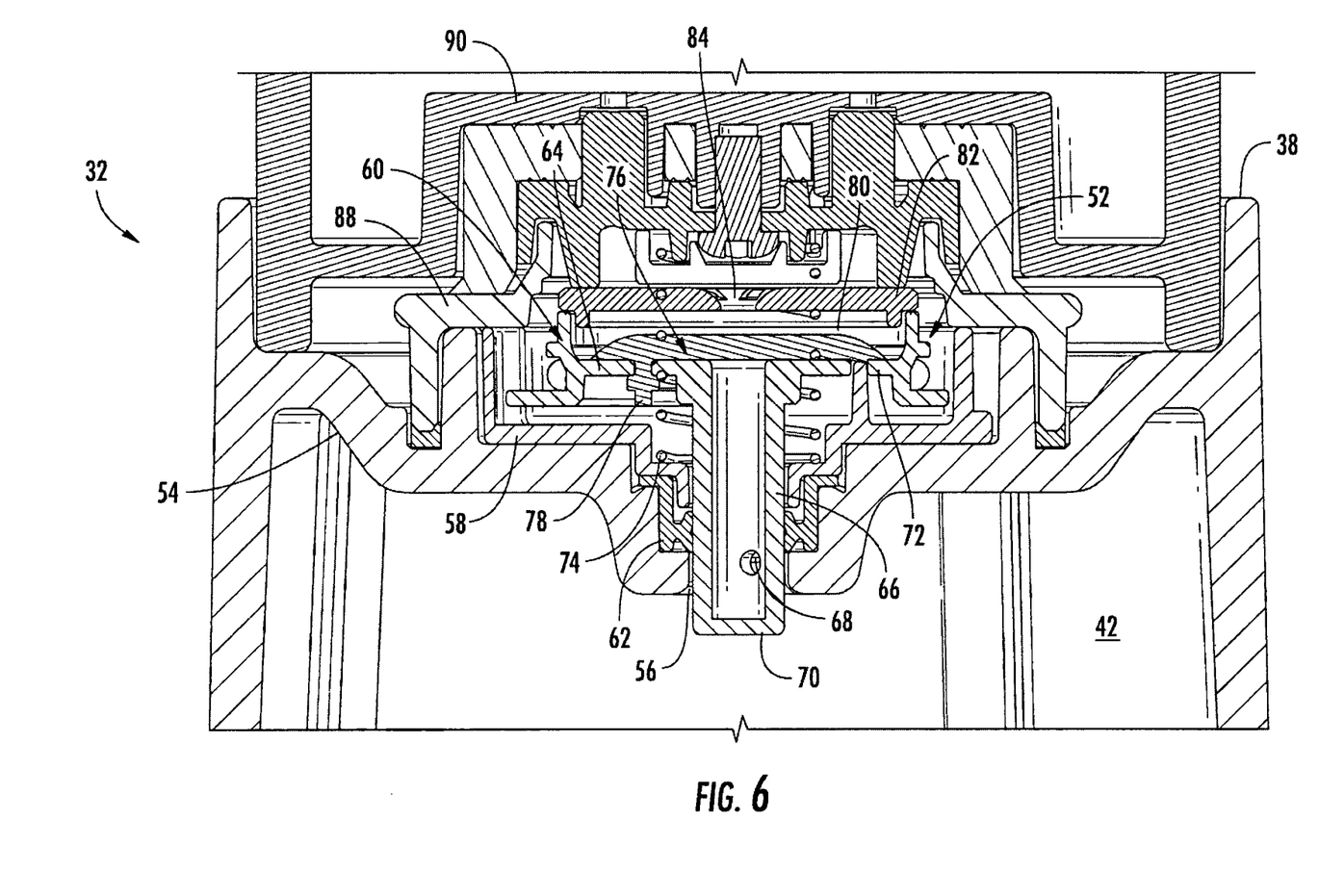
FIG. 6 is a cross-sectional view of the vacuum sealing assembly of FIG. 4 in a second configuration according to an embodiment.

The vacuum sealing assembly 52 of FIGS. 5-7 is transformable between a plurality of configurations and corresponding operational modes. In a first, normal or default mode of operation, as shown in FIG. 5, the vacuum sealing assembly 52 is in a first configuration. In the first configuration, the needle valve 60 is in a first position, resulting from the biasing force of the biasing member 74 acting on the flange 64 of the needle valve 60. In the first position, the valve stem 66, and specifically the hole 68 formed therein, is positioned outside of the chamber 42 of the container 32. As shown, in this configuration, the distal end 70 of the needle valve 60 and the adjacent seal 62 cooperate to restrict a flow of fluid or food particles from the chamber 42 via the opening 56.

In a second mode of operation, shown in FIG. 7, the vacuum sealing assembly 52 is arranged in a second configuration as a result of a vacuum pump or other suitable device 90 positioned in overlapping arrangement with the vacuum sealing assembly 52. In the second configuration, the vacuum device 90 applies a force to the needle valve 60 via the vacuum pad 82 that opposes the biasing force of the biasing mechanism 74. As a result, in the second configuration, the hole 68 formed in the distal end 70 of the valve stem 66 is arranged in fluid communication with the chamber 42 of the container 32. Accordingly, when the vacuum sealing assembly 52 is in the second configuration, the needle valve 60 is arranged at a position between the first position and the second position.

Further, in the second mode of operation, the vacuum device 90 generates a negative pressure which is applied to the umbrella valve 76 via the opening 84 formed in the vacuum pad 82. The negative pressure generated will cause the peripheral portion of the flange 80 to separate from the opening 72 just enough to allow air within the chamber 42 to be drawn through the hollow valve stem 66 and the opening 72. As soon as the vacuum pressure generated by the device 82 ceases, the peripheral portion of the flange 80 will bias back into its original position to seal the opening 72. This bias may be the result of the resilient material from which the umbrella valve 76 is formed. The vacuum sealing assembly 52 is typically in this second mode of operation after food has been disposed within the chamber 42 but prior to performing a food processing operation.

The vacuum sealing assembly 52 has a third configuration associated with a third mode of operation. In the third mode of operation, illustrated in FIG. 7, the distal end 70 of the needle valve 60 is arranged in communication with the chamber 42 and the peripheral portion of the flange 80 of the umbrella valve is lifted away from the opening 72, absent a vacuum device 90, to allow air to flow into the chamber 42. To transform the vacuum sealing assembly 52 to the third configuration, a user manually applies a force to the flange 64 of the needle valve 60, via the vacuum pad 82. The applied force opposes the biasing force of the biasing member 74 causing the biasing member 74 to compress.

In the illustrated, non-limiting embodiment, a protrusion 92 extends from the base support 58 in vertical alignment with the at least one opening 72 formed in the flange 64. As the needle valve 60 moves downwardly, the protrusion 92 is received within the at least one opening 72 and applies an upward force to the peripheral portion of the flange 80 of the umbrella valve 76. This movement of the umbrella valve 76 when the hole 68 in the valve stem 66 of the needle valve 60 is arranged within the chamber 42 of the container 32 breaks the vacuum by allowing air to flow therein. After a vacuum has been generated within the chamber 42 of the container 32, it is difficult, if not impossible to remove the blade assembly 34 and access the food product within the chamber 42 as a result of the forces acting thereon. Accordingly, a user should first break the vacuum within the container 32 by transforming the vacuum sealing assembly 52 into the third configuration prior to accessing the contents within the interior 42 of the container 32.

A container 32 having a vacuum sealing assembly 52 as illustrated and described herein when used in conjunction with a vacuum device prior to a food processing operation may provide a food product having increased vitamin retention, specifically vitamin C. Exposure to oxygen within during the blending process may cause the ingredients within the container to degrade. By removing the oxygen from the container, the overall degradation of the nutritional properties of the ingredients being processes is reduced.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A container assembly comprising:
a sealable body including a chamber;
a chamber opening formed in said sealable body; and
a vacuum sealing assembly mounted to said sealable body adjacent said chamber opening, said vacuum sealing assembly including:
a needle valve having a needle valve opening formed therein, said needle valve being movable relative to said chamber opening such that the needle valve opening is movable into and out of said chamber;
a vacuum pad coupled to said needle valve, said vacuum pad including a central opening; and
a biasing mechanism operably coupled to said needle valve to move said needle valve opening out of said chamber.

2. The container assembly of claim 1, wherein said needle valve is arranged in sealing engagement with said chamber opening when said needle valve opening is out of said chamber and said sealing engagement between said needle valve and said chamber opening is broken when said needle valve opening is in said chamber.

3. The container assembly of claim 1, wherein said needle valve further comprises a generally hollow valve stem arranged in fluid communication with said needle valve opening.

4. The container assembly of claim 1, wherein said biasing mechanism is a coil spring mounted between said sealable body and said needle valve.

5. The container assembly of claim 1, wherein the sealable assembly further comprises:
a container defining said chamber, said container having an open end; and
a rotatable blade assembly connected to said open end of said container.

6. The container assembly of claim 1, wherein said vacuum sealing assembly is formed in said container.

7. The container assembly of claim 1, wherein said vacuum sealing assembly is formed in said rotatable blade assembly.

8. The container assembly of claim 1, wherein the sealable assembly further comprises:
a container defining said chamber, said container having an open end;
at least one rotatable blade disposed within said chamber; and
a lid connected to said open end of said container.

9. The container assembly of claim 8, wherein said vacuum sealing assembly is formed in said lid.

10. A food processing system comprising:
a food processor base including a rotary component;
an attachment configured for removable association with said food processor base, said attachment including:
a sealable body including at least one opening;
a rotary coupling connected to at least one blade positioned within said chamber of said sealable body, and said rotary coupling being associable with said rotary component of said food processor base; and
a vacuum sealing assembly mounted to said container adjacent said at least one chamber opening, said vacuum sealing assembly including:
a needle valve having a needle valve opening formed therein, the needle valve being movable in and out of said chamber opening to fluidly couple said needle valve opening and said chamber; and
a vacuum pad coupled to said needle valve, said vacuum pad including a central opening.

11. The food processing system according to claim 10, further comprising a biasing mechanism operably coupled to said needle valve to move said needle valve opening out of said chamber.

12. The food processing system according to claim 10, wherein said needle valve is arranged in sealing engagement with said chamber opening when said needle valve opening is out of said chamber and said sealing engagement between said needle valve and said chamber opening is broken when said needle valve opening is in said chamber.

13. The food processing system according to claim 10, wherein said needle valve further comprises a generally hollow valve stem arranged in fluid communication with said needle valve opening.

14. The food processing system according to claim 10, further comprising an umbrella valve coupled to said needle valve to selectively seal said generally hollow valve stem.

15. The food processing system according to claim 14, further comprising a protrusion operable to break a sealing engagement between said umbrella valve and said needle valve when said needle valve opening is in said chamber.

16. A method of blending one or more food items, comprising
arranging the one or more food items within a chamber of a food processing container;
moving a needle valve opening formed in a needle valve into fluid communication with said chamber to form a vacuum within said chamber, wherein moving said needle valve into fluid communication with said chamber to form said vacuum within said chamber comprises:
applying a vacuum device to said vacuum sealing assembly; and
performing a food processing operation.

17. The method of claim 16, wherein forming said vacuum within said chamber includes applying a negative pressure to an umbrella valve sealing a hollow valve stem of said needle valve, said hollow valve stem being fluidly coupled to said needle valve opening.

18. The method of claim 16, further comprising removing said vacuum device prior to performing said food processing operation.

19. The method of claim 16, further comprising moving said needle valve opening into fluid communication with said chamber to release said vacuum within said chamber.

* * * * *